(12) United States Patent
Chou et al.

(10) Patent No.: US 8,995,255 B2
(45) Date of Patent: Mar. 31, 2015

(54) COVERAGE ADJUSTMENT IN E-UTRA NETWORKS

(71) Applicant: Intel Corporation, Santa Clara, CA (US)

(72) Inventors: Joey Chou, Scottsdale, AZ (US); Jorge Mena, Moreno Valley, CA (US)

(73) Assignee: Intel Corporation, Santa Clara, CA (US)

( * ) Notice: Subject to any disclaimer, the term of this patent is extended or adjusted under 35 U.S.C. 154(b) by 9 days.

(21) Appl. No.: 13/733,110

(22) Filed: Jan. 2, 2013

(65) Prior Publication Data

US 2014/0036656 A1 Feb. 6, 2014

Related U.S. Application Data

(60) Provisional application No. 61/679,627, filed on Aug. 3, 2012.

(51) Int. Cl.
*H04L 12/26* (2006.01)
*H04L 5/00* (2006.01)
(Continued)

(52) U.S. Cl.
CPC ............ *H04L 5/0057* (2013.01); *H04W 24/04* (2013.01); *H04W 28/0236* (2013.01); *H04W 40/34* (2013.01); *H04W 72/005* (2013.01); *H04W 76/02* (2013.01); *H04W 72/044* (2013.01); *H04W 72/0406* (2013.01); *H04W 72/042* (2013.01); *H04W 72/04* (2013.01); *H04L 65/80* (2013.01); *H04L 67/16* (2013.01); *H04W 88/06* (2013.01); *H04W 24/02* (2013.01); *H04W 72/0413* (2013.01); *H04L 67/303* (2013.01);
(Continued)

(58) Field of Classification Search
None
See application file for complete search history.

(56) References Cited

U.S. PATENT DOCUMENTS 8,170,547 B1 5/2012 Bhan et al.
2006/0128371 A1* 6/2006 Dillon et al. .................. 455/423
(Continued)

FOREIGN PATENT DOCUMENTS

EP 2302968 A2 3/2011
EP 2334113 A1 6/2011
(Continued)

OTHER PUBLICATIONS

Search Report issued Dec. 9, 2013 from Belgium Patent Application No. 2013/0520.
(Continued)

*Primary Examiner* — Otis L Thompson, Jr.
(74) *Attorney, Agent, or Firm* — Schwabe, Williamson & Wyatt, P.C.

(57) ABSTRACT

Embodiments of systems and techniques for coverage adjustment in evolved universal terrain radio access networks (E-UTRANs) are described. In some embodiments, a network management (NM) apparatus may receive data representative of first and second radio link failure (RLF) reports including information related to respective disconnections of first and second user equipment (UEs) from an E-UTRAN. The NM apparatus may identify a hole in a coverage area of the E-UTRAN based at least in part on the first and second RLF reports, and may perform an automated coverage and capacity optimization (CCO) action to reconfigure cell resources of the E-UTRAN based on the identified hole. Other embodiments may be described and claimed.

29 Claims, 8 Drawing Sheets (51) Int. Cl.
| | |
|---|---|
| *H04W 24/04* | (2009.01) |
| *H04W 28/02* | (2009.01) |
| *H04W 40/34* | (2009.01) |
| *H04W 72/00* | (2009.01) |
| *H04W 76/02* | (2009.01) |
| *H04W 72/04* | (2009.01) |
| *H04L 29/06* | (2006.01) |
| *H04L 29/08* | (2006.01) |
| *H04W 88/06* | (2009.01) |
| *H04W 24/02* | (2009.01) |
| *H04N 21/2343* | (2011.01) |
| *H04N 21/258* | (2011.01) |
| *H04W 4/00* | (2009.01) |
| *H04W 40/02* | (2009.01) |
| *H04L 12/24* | (2006.01) |
| *H04W 16/28* | (2009.01) |

(52) U.S. Cl.
CPC ...... *H04L 65/4092* (2013.01); *H04N 21/23439* (2013.01); *H04N 21/25825* (2013.01); *H04L 5/00* (2013.01); *H04W 4/00* (2013.01); *H04W 40/02* (2013.01); *H04L 41/0836* (2013.01); *H04L 43/0811* (2013.01); *H04W 16/28* (2013.01); *Y02B 60/50* (2013.01)
USPC .......................................... 370/229

(56) References Cited

U.S. PATENT DOCUMENTS

| | | | |
|---|---|---|---|
| 2006/0141932 A1* | 6/2006 | Lawrence et al. | 455/41.2 |
| 2008/0032727 A1* | 2/2008 | Stephenson et al. | 455/513 |
| 2008/0125144 A1* | 5/2008 | Ruutu et al. | 455/457 |
| 2009/0233595 A1* | 9/2009 | Harris et al. | 455/425 |
| 2010/0197239 A1* | 8/2010 | Catovic et al. | 455/67.11 |
| 2011/0130135 A1* | 6/2011 | Trigui | 455/423 |
| 2011/0212720 A1 | 9/2011 | Hamalainen et al. | |
| 2012/0004001 A1* | 1/2012 | Power et al. | 455/507 |
| 2012/0088498 A1* | 4/2012 | Xiao et al. | 455/424 |
| 2012/0108199 A1 | 5/2012 | Wang et al. | |
| 2012/0127876 A1 | 5/2012 | Hunukumbure et al. | |
| 2013/0070615 A1* | 3/2013 | Lennartson et al. | 370/242 |

FOREIGN PATENT DOCUMENTS

| | | |
|---|---|---|
| EP | 2437537 A1 | 4/2012 |
| GB | 2481614 A | 1/2012 |
| WO | WO2010/051838 A1 | 5/2010 |
| WO | WO2010/151064 A2 | 12/2010 |
| WO | 2011097729 A1 | 8/2011 |
| WO | WO2012/019363 A1 | 2/2012 |

OTHER PUBLICATIONS

International Search Report and Written Opinion mailed Oct. 24, 2013 from International Application No. PCT/US2013/048360.

3GPP, "3rd Generation Partnership Project; Technical Specification Group Services and System Aspects; Telecommunication management; Study on NM Centralized Coverage and Capacity Optimization (CCO) SON Function (Release 12)," 3GPP TR 32.836 V0.3.0, Lte Advanced, Oct. 31, 2012, 14 pages.

Search Report issued Mar. 17, 2014 from Dutch Patent Application No. 201258.

CATT, "Derivation of functions for CCO," 3GPP TSG-RAN WG3 Meeting #64, May 4-8, 2009, Agenda item: 10.1.2, San Francisco, CA, 9 pages.

ZTE, "Coverage and Capacity optimization," 3GPP TSG-RAN WG3 Meeting #68, May 10-14, 2010, Agenda item: 17.1.2, Montreal, Canada, 7 pages.

Search Report issued Dec. 3, 2014 from Spanish Patent Application No. P201331217.

Search Report issued Nov. 27, 2014 from Taiwan Patent Application No. 102127463.

* cited by examiner

COVERAGE ADJUSTMENT IN E-UTRA NETWORKS

CROSS-REFERENCE TO RELATED APPLICATION

This application claims priority to U.S. Provisional Patent Application No. 61/679,627, entitled "Advanced Wireless Communication Systems and Techniques" and filed Aug. 3, 2012, the contents of which are hereby incorporated by reference in their entirety herein.

TECHNICAL FIELD

The present disclosure relates generally to wireless communication, and more particularly, to systems and techniques for coverage adjustment in evolved universal terrain radio access networks (E-UTRANs).

BACKGROUND

E-UTRANs are typically deployed as a set of coverage cells providing service to user equipments (UEs) in covered geographic areas. Service in an E-UTRAN may be compromised when a coverage hole arises due to, e.g., signal propagation attenuation, shadowing effects, signal interference, and object obstructions. For example, a coverage hole (e.g., an area of weak coverage or an area of no coverage) may arise in a geographic location that is bounded by tall buildings and/or located at the edges of a coverage cell.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Embodiments of systems and techniques for coverage adjustment in E-UTRANs are described. In some embodiments, an NM apparatus may receive data representative of first and second radio link failure (RLF) reports including information related to respective disconnections of first and second UEs from an E-UTRAN. The NM apparatus may identify a hole in a coverage area of the E-UTRAN based at least in part on the first and second RLF reports, and may perform an automated coverage adjustment action (such as a coverage and capacity optimization (CCO) action) to reconfigure cell resources of the E-UTRAN based on the identified hole.

In some embodiments, an NM apparatus may receive data representative of performance of a service provided by an E-UTRAN. In particular, the data may be representative of service performance at a plurality of geographic locations covered by one or more cells of the E-UTRAN. The NM apparatus may correlate the data to identify a service-deficient geographic area, and may adjust one or more cells of the E-UTRAN to provide additional service to the service-deficient geographic area. Other embodiments may be described and claimed.

Some of the systems and techniques disclosed herein may enable the identification of coverage holes that may not be otherwise detected. By correlating multiple RLF reports, an NM apparatus or other component may identify RLF patterns that would go unnoticed during conventional operation. Some of the systems and techniques disclosed herein may enable service improvements in otherwise service-deficient areas. For example, aggregating service performance information to inform the adjustment of cells of an E-UTRAN, as disclosed herein, may enable a faster and more appropriate reconfiguration of network resources in times and areas of high service demand. The present disclosure may be particularly advantageous in self-organizing network (SON) applications, including those in which network optimization is centralized in one or more NM apparatus or other devices.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As may be used herein, the term "module" or "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
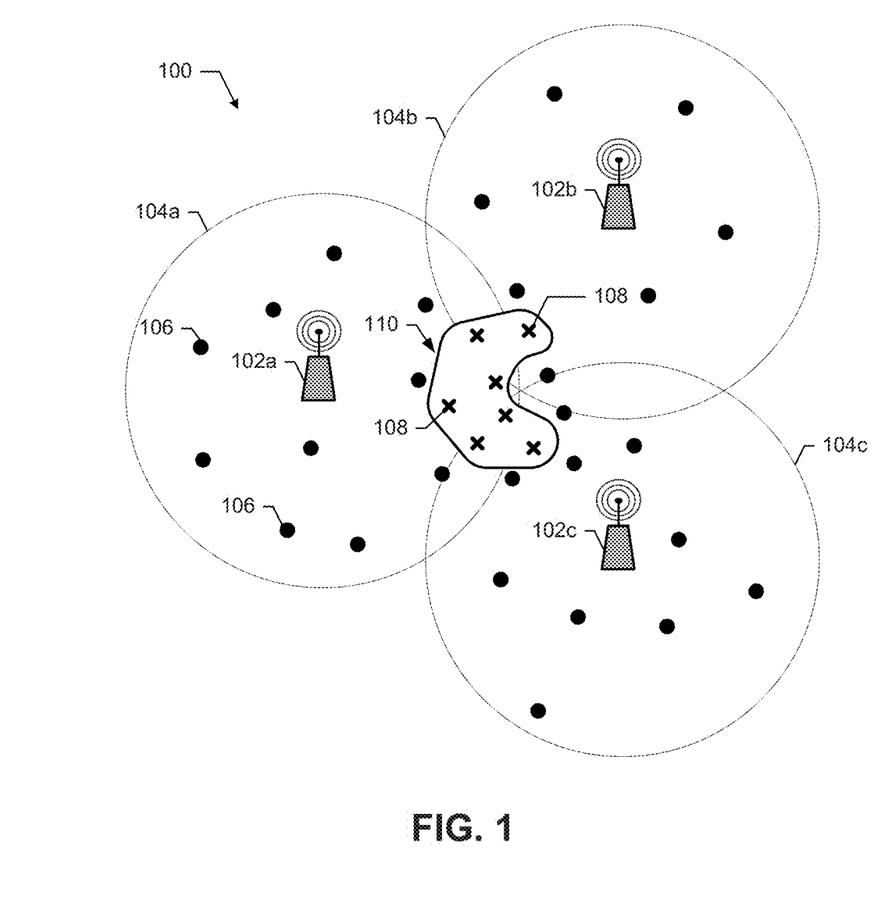
FIG. 1 illustrates an environment in which radio link failures (RLFs) may be used to identify a hole in a coverage area of an E-UTRAN, in accordance with various embodiments.

Referring now to FIG. 1, an environment 100 is illustrated in which three eNBs 102a, 102b and 102c provide service in respective coverage cells 104a, 104b and 104c. In some embodiments, eNBs 102a, 102b and 102c may be part of an E-UTRAN. In some embodiments, eNBs 102a, 102b and 102c may be base stations supporting one or more other radio access technologies (RATs) such as a universal mobile telecommunications system terrestrial radio access (UTRA) technology or a global system for mobile communications enhanced data rates for global system for mobile communication evolution radio access (GERA) technology. eNBs 102a, 102b and 102c may provide service to one or more UEs located in coverage cells 104a, 104b and 104c, respectively.

In some embodiments, UEs served by the various eNBs of FIG. 1 may periodically or aperiodically report performance metrics to the serving eNBs or other components of the RAT network. These reports may include location information for the UE (e.g., coordinates or other information that enables the approximate location of the UE to be determined). In some embodiments, the performance metrics and the location information may be provided to one or more centralized entities, such as an NM apparatus, so that locations with acceptable performance and locations with unacceptable performance may be identified.

For example, in FIG. 1, UEs reporting acceptable performance metrics may be indicated by solid dots 106 (for clarity, only a few solid dots are labeled in the figure). UEs reporting unacceptable performance metrics may be indicated by "x" marks 108 in FIG. 1 (again, for clarity, only a few "x" marks are labeled in the figure). Unacceptable performance may include, for example, failure to achieve a desired level of signal strength or the failure to successfully provide service to UE devices within a certain number of access attempts (e.g., radio resource control (RRC) connection attempts and/or random access attempts). In some embodiments, unacceptable performance is signaled by an RLF report from a UE. By analyzing the locations at which unacceptable performance occurs, an NM apparatus or other component of the network may identify the approximate boundaries of coverage hole 110. Additional embodiments are described herein.

Figure 2A:
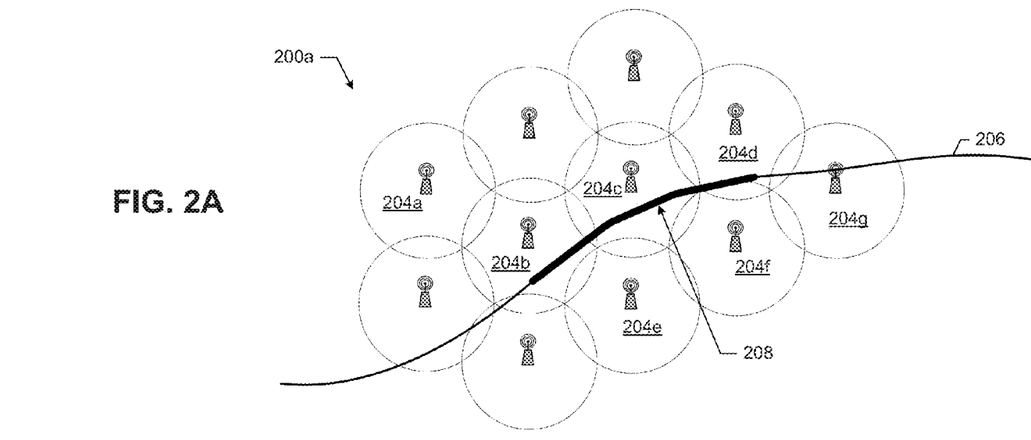
FIGS. 2A and 2B illustrate a service-deficient geographic area and a coverage adjustment that provides additional service to the service-deficient geographic area, in accordance with various embodiments.

Referring now to FIG. 2A, an environment 200a is illustrated in which multiple eNBs (only a few of which, 204a-204g, are labeled) provide service in respective coverage cells (indicated by the circles surrounding the eNBs in FIG. 2A). In some embodiments, the eNBs of FIG. 2A may be part of an E-UTRAN. As discussed above with reference to FIG. 1, the eNBs of FIG. 2A may be base stations supporting one or more other RATs such as an UTRA technology or a GERA technology. The eNBs of FIG. 2A may provide service to one or more UEs located in their associated coverage cells.

Also shown in FIG. 2A is a highway 206, which runs through the geographic area served by one or more of the eNBs. A portion 208 of highway 206 is shaded to indicate that this portion exhibits a relatively high wireless traffic demand. The wireless traffic demand of portion 208 may be due to any number of causes, such as the dynamic characteristics of users of UEs and environmental information such as the infrastructure and use of the built environment. For example, increased demand may be caused by highway traffic rush hours, vehicle accidents that cause extended back-ups, holiday travel, the beginning and/or end of a sporting event at a sports complex (e.g., a stadium). Any of a number of regular and irregular behaviors or conditions may cause wireless traffic demand to be non-uniform within a cell or across adjacent or closely-spaced cells. In situations of increased wireless traffic demand, some UEs (in particular, those located near portion 208 of highway 206) may be starved of the desired resources and may experience service deficiencies.

In some embodiments, data representative of the service performance of the E-UTRAN or other network supported by the eNBs of FIG. 2A may be provided to one or more centralized entities, such as an NM apparatus, so that service-deficient geographic areas (such as portion 208) may be identified. For example, data representative of the number of active UEs in a given area, the upload or download physical resource block (PRB) usage, the internet protocol (IP) throughout, packet delay, drop rate, loss rate, and/or any of a number of other performance metrics may be used to identify service-deficient areas. Data representing environmental information, such as the location of a highway or sports complex, may also be used in identifying service-deficient areas.

Figure 2B:
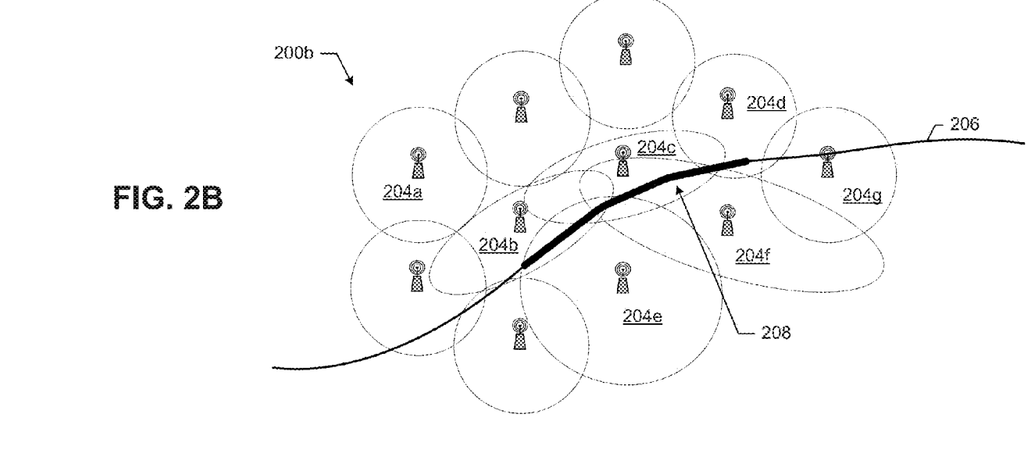

Once a service-deficient area has been identified, one or more cells supported by the eNBs may be adjusted to provide additional service to the service-deficient geographic area. Such an adjustment is shown in environment 200b of FIG. 2B, in which the cells associated with eNBs 204b, 204c, 204e and 204f have been adjusted to provide additional coverage to high wireless traffic demand portion 208 of highway 206. Cell adjustment may include reshaping cells by adjusting wireless antennas, making cells smaller to boost capacity, providing more power to antennas to increase the size of cells, or any of a number of other adjustments. Additional embodiments are described herein.

Figure 3:
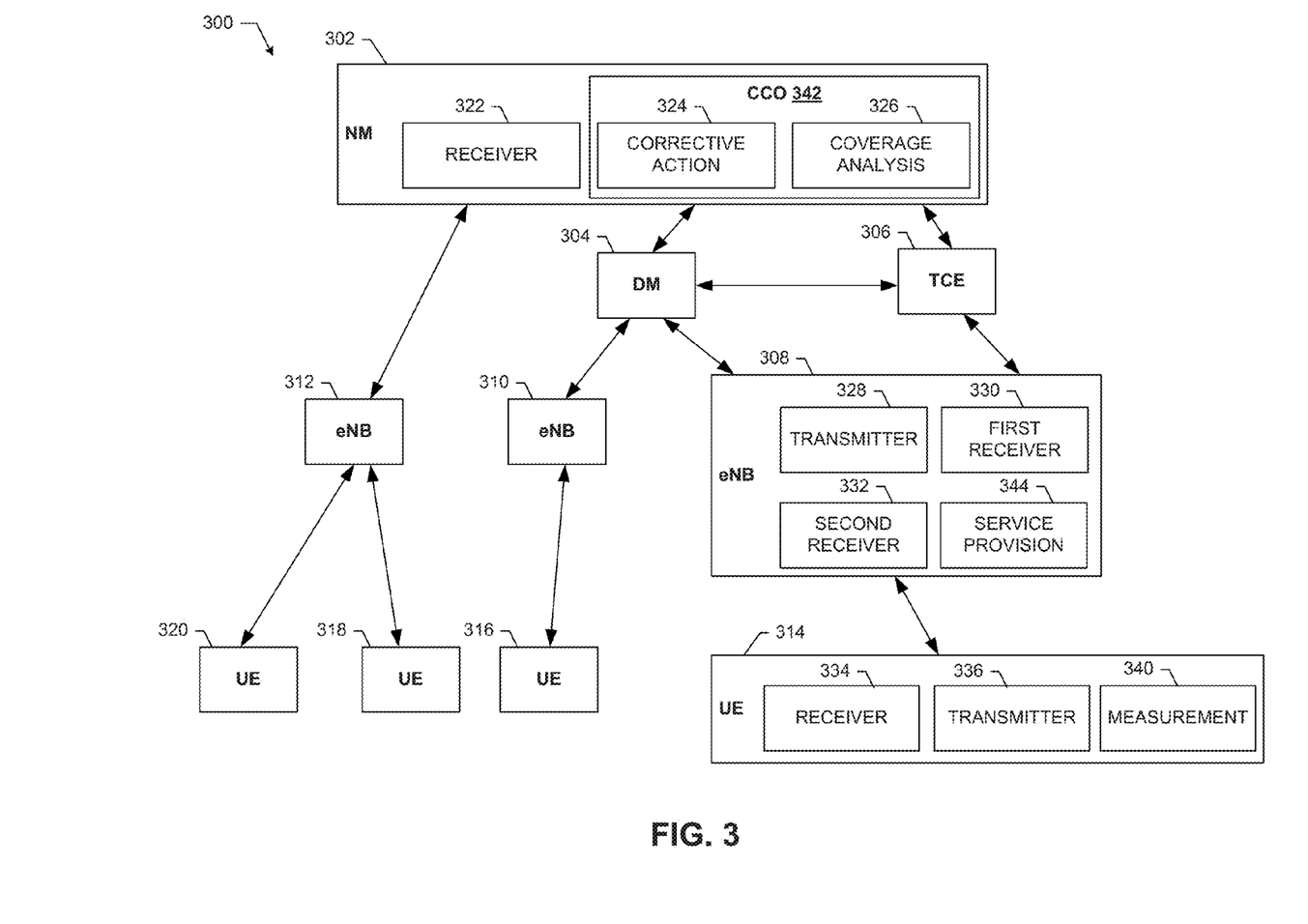
FIG. 3 is a block diagram illustrating an example coverage adjustment system, in accordance with various embodiments.

Referring now to FIG. 3, a block diagram of an example coverage adjustment system 300 is illustrated, in accordance with various embodiments. In particular, system 300 may be used to implement any of the coverage adjustment systems and techniques described above with reference to FIGS. 1, 2A and 2B. System 300 may be configured to support a RAT, such as E-UTRAN. Examples of components of system 300 may often be discussed with reference to a 3G LTE RAT, but system 300 may be used to implement other RATs (such as those discussed herein). System 300 may be configured to deliver any of a number of services, such as multimedia delivery over HTTP, live streaming over RTP, conversational services (e.g., video conferencing), and TV broadcasting, for example. System 300 may include other wireless personal area network (WPAN), wireless local area network (WLAN), wireless metropolitan area network (WMAN), and/or wireless wide area network (WWAN) devices such as network interface devices and peripherals (e.g., network interface cards (NICs)), access points (APs), redistribution points, end points, gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, and/or any other suitable communication system. While embodiments may described in the context of LTE networks, embodiments may also be employed in other networks (e.g., WiMAX networks).

System 300 may include an NM apparatus 302. In some embodiments, NM apparatus 302 may monitor the components of system 300 and collect measurements of its performance. Based on the analysis of these measurements, NM apparatus 302 may identify potential problems and improvements in the configuration and operation of the components of system 300, and may implement changes to system 300. NM apparatus 302 may include receiver circuitry 322, coverage analysis circuitry 324 and corrective action circuitry 326.

Receiver circuitry 322 may be configured for receiving signals from other devices by wired or wireless connections. For example, receiver circuitry 322 may be configured to receive signals from or transmit signals to an element manager (EM) component of an eNB (such as any of eNBs 308-312), a domain management (DM) apparatus 304 (which may provide management functions for a domain or other portion of system 300), or any other suitably configured devices. In some embodiments, NM apparatus 302 may communicate with an eNB via a wired connection. In embodiments in which receiver circuitry 322 is configured for wireless communications, receiver circuitry 322 may include, for example, one or more directional or omni-directional antennas (not shown) such as dipole antennas, monopole antennas, patch antennas, loop antennas, microstrip antennas, and/or other types of antennas suitable for reception of radio frequency (RF) or other wireless communication signals.

In some embodiments, receiver circuitry 322 may be configured to receive data representative of performance of a service provided by an E-UTRAN (or other RAT network) supported by system 300. The data may be representative of service performance at a plurality of geographic locations covered by one or more cells of the E-UTRAN or other RAT network. For example, the data may include, for one or more of the plurality of geographic locations, information such as a number of active UEs, upload or download physical resource block usage, internet protocol (IP) throughput, packet delay, drop rate, and/or loss rate. In some embodiments, receiver circuitry 322 may be configured to receive the data from one or more eNBs serving the one or more cells. In some embodiments, receiver circuitry 322 may be configured to receive the data via an interface-N (Itf-N).

In some embodiments, receiver circuitry 322 may be configured to receive data representative of a first RLF report. The first RLF report may include information related to a disconnection of a first user UE (such as UE 314) from an E-UTRAN or other RAT supported by system 300. For example, the first RLF report may include any of a number of measurements taken by the first UE or the first eNB or other device that provides the first RLF report, such as one or more of a reference signal received power (RSRP), a reference signal received quality (RSRQ), an identifier of a cell from which the first UE was connected prior to the disconnection of the first UE from the RAT, location information (e.g., information about the location of the first UE when the disconnection occurred), and a time stamp representative of a time of disconnection. Receiver circuitry 322 may be configured to receive the data representative of the first RLF report from a first eNB serving the first UE (such as eNB 308 when it serves UE 314). In some embodiments, receiver circuitry 322 may be configured to receive the data from the eNB upon reconnection of the first UE to the E-UTRAN or other RAT supported by system 300.

In some embodiments, receiver circuitry 322 may be configured to receive a second RLF report. The second RLF report may include information related to a disconnection of a second UE from the E-UTRAN or other RAT supported by system 300. The information included in the second RLF report may include any of the types of information described above with reference to the first RLF report. In some embodiments, receiver circuitry 322 may be configured to receive the data representative of the second RLF report from a second eNB serving the second UE. Receiver circuitry 322 may be configured to receive the data representative of the second RLF report upon reconnection of the second UE to the E-UTRAN or other RAT supported by system 300. In some embodiments, the first and second eNBs may be a common eNB (e.g., eNB 308). In some embodiments, the first and second eNBs may be different eNBs (e.g., eNBs 310 and 308).

In some embodiments, data representative of service performance (such as RLF reports and other data) may be transmitted to NM apparatus 302 by DM apparatus 304 in communication with one or more eNBs (such as eNBs 308 and 310, as shown). In some embodiments, RLF reports and other service performance data may be transmitted to NM apparatus 302 by TCE 306 in communication with a DM apparatus (such as DM apparatus 304) and/or one or more eNBs (such as eNB 308, as shown).

NM apparatus 302 may include coverage analysis circuitry 324. In some embodiments, coverage analysis circuitry 324 and corrective action circuitry 326 may be included in a centralized coverage and capacity optimization (CCO) component 342 of NM apparatus 302. In some embodiments, coverage analysis circuitry 326 may be configured to correlate data received by receiver circuitry 322 to identify a service-deficient geographic area (such as portion 208 of highway 206 of FIG. 2A). Correlating data may include, among other things, associating multiple reports or measurements with a same user session occurrence or a same geographic area.

In some embodiments, coverage analysis circuitry 324 may be configured to identify a hole in a coverage area of the RAT supported by system 300 (such as an E-UTRA technology) based at least in part on multiple RLF reports, such as the first and second RLF reports discussed above. For example, in some embodiments, coverage analysis circuitry 324 may identify a hole in a coverage area of an E-UTRAN by correlating multiple RLF reports (e.g., the first and second RLF reports).

In some embodiments, coverage analysis circuitry 324 may be configured to access data representative of environmental information (e.g., the infrastructure and use of a built environment). Examples of such data may include the location of a road, a sports complex, a tall building, or any other information about the environment within a cell that may impact the delivery of wireless service. Such data may also include temporal information about use of the infrastructure of a built environment, such as a sporting event schedule or rush hour schedule. In some embodiments, coverage analysis circuitry 324 may correlate data representative of service performance (e.g., as discussed above) with data representative of a built environment to identify a service-deficient geographic area. For example, if poor performance is reported at several geographic locations known to be located along a particular portion of a highway, coverage analysis circuitry 324 may identify a service-deficient area spanning that portion of the highway.

In some embodiments, coverage analysis circuitry 324 may be configured to initiate area-based minimization of drive test (MDT) protocols on one or more eNBs associated with cells that nominally cover the identified hole or service-deficient area (e.g., those cells that would provide coverage to the hole were it not for the presence of obstructions or abnormal traffic demands). Such MDT protocols may include a number of automated measurement collection and data logging processes at UEs, eNBs and other components in a wireless network, which may generate data useful for diagnostic and coverage analysis purposes. For example, MDT protocols may be executed for each of multiple cells that nominally cover an identified hole to diagnose the location and size of the hole.

NM apparatus may include corrective action circuitry 326. Corrective action circuitry 326 may be configured to recommend and/or perform a corrective action based on the service-deficient geographic area (e.g., a coverage hole) identified by coverage analysis circuitry 324. For example, in some embodiments, corrective action circuitry 326 may be configured to perform an automated CCO action to reconfigure cell resources of the E-UTRAN or other network supported by system 300 based on an identified hole. Reconfiguring cell resources may include, for example, changing the power associated with a cell's antenna(s) or changing the shape of the cell, among other things.

In some embodiments, corrective action circuitry 326 may be configured to adjust one or more cells of an E-UTRAN or other network to provide additional service to an identified service-deficient geographic area. In some embodiments, such an adjustment may include making one or more cells smaller to boost capacity in the service-deficient geographic area, reshaping one or more cells by adjusting one or more corresponding antennas (e.g., by aligning a longitudinal axis of one or more cells with a longitudinal axis of one or more roads, as shown by the cells associated with eNBs 204b and 204c of FIG. 2B), making one or more cells larger to cover at least a portion of the service-deficient geographic area, any combination of these adjustments, or any other appropriate adjustment. In some embodiments, a command to implement the corrective action may be transmitted to one or more components of system 300, such as one or more of eNBs 308-312 or UEs 314-320. In some embodiments, coverage analysis circuitry 324 and/or corrective action circuitry 326 may include a display or other output configured to provide coverage information or corrective action recommendations to a human operator, who can then intervene appropriately.

System 300 may include one or more eNBs, such as eNBs 308-312. Each of eNBs 308-312 may include a number of components; for ease of illustration, only the components of eNB 308 are shown in FIG. 3. eNBs other than eNB 308 may have similar components. The components of eNB 308, discussed in detail below, may be included in one or more of the eNBs shown in FIGS. 1, 2A and 2B.

As shown, eNB 308 may include transmitter circuitry 328. Transmitter circuitry 328 may be configured for transmitting wireless signals to other devices. For example, transmitter circuitry 328 may be configured to transmit wireless signals to NM apparatus 302, DM apparatus 304, TCE 206, UE 314, or other devices suitably configured for wireless communications. Transmitter circuitry 328 may include, for example, one or more directional or omni-directional antennas (not shown), as discussed above. In some embodiments, transmitter circuitry 328 may be configured to transmit, to NM apparatus 302, data representative of performance of a service provided by an E-UTRAN or other network supported by eNB 308 within a coverage cell served by eNB 308. For example, as discussed above, the data may include one or more of number of active UEs, upload or download PRB usage, IP throughput, packet delay, drop rate, and/or loss rate. In some embodiments, transmitter circuitry 328 may be configured to transmit data representative of an RLF report to CCO component 342 of NM apparatus 302. As discussed above, NM apparatus 302 may use the data representative of an RLF report in identifying a hole in a coverage area of an E-UTRAN or other network supported by system 300. In some embodiments, transmitter circuitry 328 may be configured to transmit data over an Itf-N.

eNB 308 may include first receiver circuitry 330. First receiver circuitry 330 may be configured for receiving signals from other devices via wired or wireless connections. First receiver circuitry 330 may be configured to receive signals from NM apparatus 302, DM apparatus 304, TCE 306 or other devices suitably configured for communications. For example, a connection between first receiver circuitry 330 and TCE 306 may be a wired connection. In embodiments in which first receiver circuitry 330 is configured for wireless communications, first receiver circuitry 330 may include, for example, one or more directional or omni-directional antennas (not shown), as discussed above.

In some embodiments, first receiver circuitry 330 may be configured to receive an instruction to adjust a service parameter of the coverage cell served by eNB 308 to provide additional service to a service-deficient geographic area. In some embodiments, the instruction may come from corrective action circuitry 326 of NM apparatus 302. The service-deficient geographic area may be identified by coverage analysis circuitry 324 of NM apparatus 302 based at least in part on, for example, data transmitted to NM apparatus 302 by transmitter circuitry 328 of eNB 308. In some embodiments, as discussed above, NM apparatus 302 may be configured to identify a service-deficient geographic area based at least in part on data representative of performance of a service provided by an E-UTRAN within one or more coverage cells served by one or more eNBs other than eNB 308 (e.g., eNBs 310 and 312). In some embodiments, the instruction received at first receiver circuitry 330 may be based at least in part on data representative of information about the environment proximate to the coverage cell served by eNB 308 (e.g., a location of a road and/or a location of a sporting event). In some embodiments, first receiver circuitry 330 may be configured to, after transmitter circuitry 328 transmits data representative of an RLF report to CCO component 342 of NM apparatus 302 in some embodiments, receive an area-based MDT query (as discussed above) from CCO component 342.

eNB 308 may include second receiver circuitry 332. Second receiver circuitry 332, like first receiver circuitry 330, may be configured for receiving wireless signals from other devices. For example, second receiver circuitry 330 may be configured to receive wireless signals UE 214 or other devices suitably configured for wireless communications. Second receiver circuitry 332 may include, for example, one or more directional or omni-directional antennas (not shown), as discussed above. In some embodiments, first receiver circuitry 330 and second receiver circuitry 332 may be the same circuitry, or may share common circuitry. In some embodiments, second receiver circuitry 332 may be configured to receive, from a UE (such as UE 314), an RLF report. The RLF report, as discussed above, may include information related to a previous disconnection of the UE (e.g., UE 314) from the E-UTRAN or other network supported by system 300. In some embodiments, the UE may generate the RLF report upon the previous disconnection of the UE from the E-UTRAN or other network. In some embodiments, the information related to the previous disconnection of the UE from the E-UTRAN or other network may include an RSRP, an RSRQ, an identifier of the coverage cell within which the UE is located, location information, and a time stamp representative of a time of disconnection.

eNB 308 may include service provision circuitry 344. Service provision circuitry 344 may provide an E-UTRAN or other service to a UE (such as UE 314) located within a coverage cell of eNB 308. In some embodiments, service provision circuitry 344 may be configured to adjust one or more service parameters of a coverage cell served by eNB 308 to adjust the coverage of the cell. In some embodiments, service provision circuitry 344 may adjust one or more service parameters in accordance with an instruction provided by NM apparatus 302 (e.g., by corrective action circuitry 326). Adjusting a service parameter of a coverage cell served by the eNB may include reshaping the coverage cell or making any of a number of other adjustments (e.g., as described above). In some embodiments, service provision circuitry 344 may be integrated with or operatively connected to transmitter circuitry 328, among other components.

In some embodiments, service provision circuitry 344 or transmitter circuitry 328 may be configured to transmit, to a UE (such as UE 314), parameters representative of measurements that should be taken by the UE as service performance data and/or in conjunction with an RLF report. For example, the parameters may be representative of one or more of RSRP, RSRQ, an identifier of the cell, location information, and a time stamp representative of a time of an event related to an RLF or other disconnection or service deficiency. In some embodiments, the parameters may be selected by an eNB (such as eNB 308), by a DM apparatus (such as DM apparatus 304), by an NM apparatus (such as NM apparatus 302), by another component of system 300, or by a combination of components.

System 300 may include one or more UEs, such as UEs 314-220. One or more of UEs 314-220 may include any of a number of wireless electronic devices such as a desktop computer, a laptop computer, a handheld computer, a tablet computer, a cellular telephone, a pager, an audio and/or video player (e.g., an MP3 player or a DVD player), a gaming device, a video camera, a digital camera, a navigation device (e.g., a GPS device), a wireless peripheral (e.g., a printer, a scanner, a headset, a keyboard, a mouse, etc.), a medical device (e.g., a heart rate monitor, a blood pressure monitor, etc.), and/or other suitable fixed, portable, or mobile electronic devices. In some embodiments, one or more of UEs 314-220 may be a mobile wireless device, such as a PDA, cellular telephone, tablet computer or laptop computer. Each of UEs 314-220 may include a number of components; for ease of illustration, only the components of UE 314 are shown in FIG. 3. UEs other than UE 314 may have similar components.

As shown, UE 314 may include receiver circuitry 334. Receiver circuitry 334 may be configured for receiving wireless signals from other devices. For example, receiver circuitry 334 may be configured to receive wireless signals from eNB 308 or other devices suitably configured for wireless communications. Receiver circuitry 334 may include, for example, one or more directional or omni-directional antennas (not shown), as discussed above. In some embodiments, receiver circuitry 334 may be configured to receive a command, from an eNB serving UE 314 (such as eNB 308) to handover UE 314 to a different eNB or to adjust another parameter of the operation of UE 314. Receiver circuitry 334 may be configured to receive instructions from eNB 308 regarding measurements that UE 314 should take for service performing monitoring purposes. Receiver circuitry 334 may also be configured to receive data related to one or more services provided to UE 314 by eNB 308 or other devices (e.g., wireless multimedia services).

UE 314 may include transmitter circuitry 336. Transmitter circuitry 336 may be configured for transmitting wireless signals to other devices. For example, transmitter circuitry 336 may be configured to transmit wireless signals to eNB 308 or other devices suitably configured for wireless communications. Transmitter circuitry 336 may include, for example, one or more directional or omni-directional antennas (not shown), as discussed above. In some embodiments, transmitter circuitry 336 may be configured to transmit one or more measurements related to service performance (such as RLF-related measurements) taken by UE 314 to eNB 308 or another component of system 300.

UE 314 may include measurement circuitry 340. Measurement circuitry 340 may be configured to take the one or more measurements discussed above with reference to receiver circuitry 334 and transmitter circuitry 336. In particular, in some embodiments, the one or more measurements may include an RSRP, an RSRQ, an identifier of a cell to which the UE was connected before a disconnection, location information, and a time stamp representative of a time of an event related to an RLF or other disconnection or service deficiency.

Figure 4:
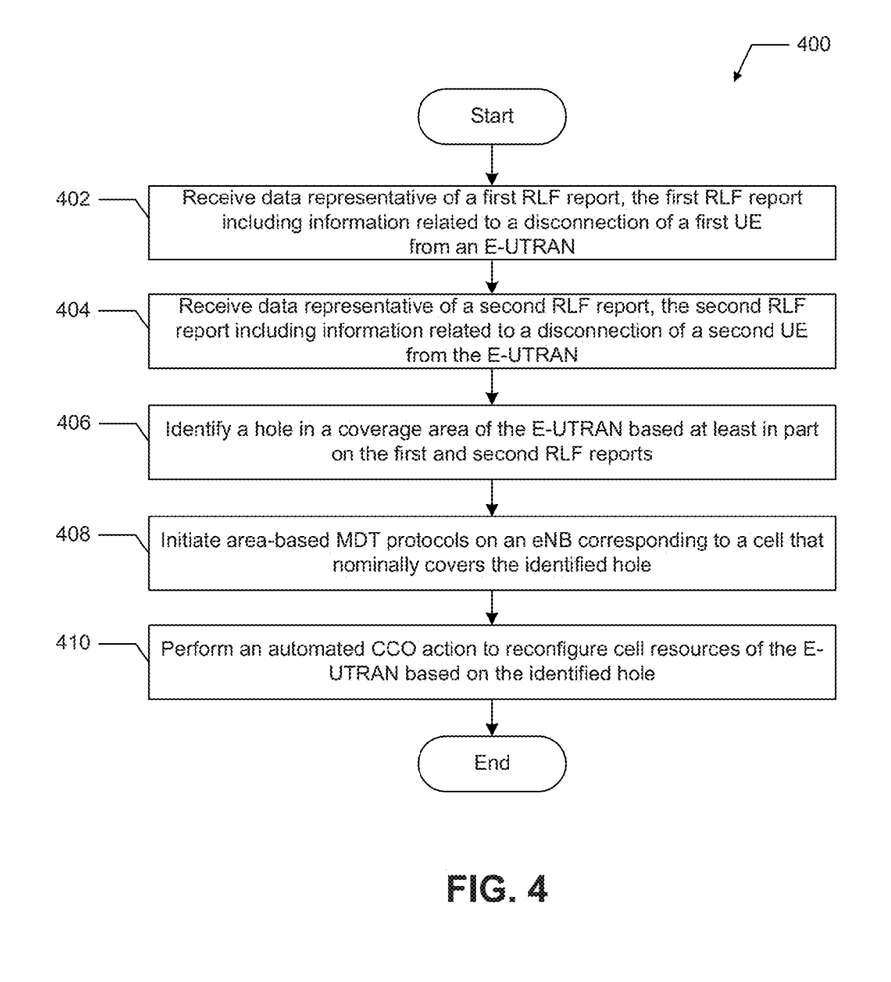
FIG. 4 is a flow diagram of an example coverage adjustment process executable by a network management (NM) apparatus, in accordance with various embodiments.

Referring now to FIG. 4, a flow diagram of example coverage adjustment process 400 executable by an NM apparatus (such as NM apparatus 302 of FIG. 3) is illustrated, in accordance with various embodiments. It may be recognized that, while the operations of process 400 (and the other processes described herein) are arranged in a particular order and illustrated once each, in various embodiments, one or more of the operations may be repeated, omitted or performed out of order. For illustrative purposes, operations of process 400 may be described as performed by NM apparatus 302 (FIG. 3), but process 400 may be performed by any suitably configured device.

Process 400 may begin at operation 402, in which NM apparatus 302 may receive data representative of a first RLF report, the first RLF report including information related to a disconnection of a first UE from an evolved universal terrestrial radio access network (E-UTRAN. In some embodiments, operation 402 may be executed by receiver circuitry 322 (FIG. 3). In some embodiments, operation 302 may include receiving data representative of a first RLF report from a first eNB serving the first UE upon reconnection of the first UE to the E-UTRAN. In some embodiments, the information related to the disconnection of the first UE from the E-UTRAN includes one or more of RSRP, RSRQ, an identifier of a cell from which the first UE was connected prior to the disconnection of the first UE from the E-UTRAN, location information, and a time stamp representative of a time of disconnection.

At operation 404, NM apparatus 302 may receive data representative of a second RLF report, the second RLF report including information related to a disconnection of a second UE from the E-UTRAN. In some embodiments, operation 404 may be executed by receiver circuitry 322 (FIG. 3). In some embodiments, operation 404 may include receiving data representative of a second RLF report from a second eNB serving the second UE upon reconnection of the second UE to the E-UTRAN. The first and second eNBs may be a common eNB, or may be different eNBs.

At operation 406, NM apparatus 302 may identify a hole in a coverage area of the E-UTRAN based at least in part on the first and second RLF reports (received at operations 402 and 404). In some embodiments, operation 406 may be executed by coverage analysis circuitry 324 (FIG. 3). At operation 408, NM apparatus 302 may initiate area-based MDT protocols on one or more eNBs associated with cells that nominally cover the hole identified at operation 406. In some embodiments, operation 408 may be executed by coverage analysis circuitry 324 (FIG. 3). At operation 410, NM apparatus may perform an automated CCO action to reconfigure cell resources of the E-UTRAN based on the hole identified at operation 406. In some embodiments, operation 410 may be executed by corrective action circuitry 326 (FIG. 3). Process 400 may then end.

Figure 5:
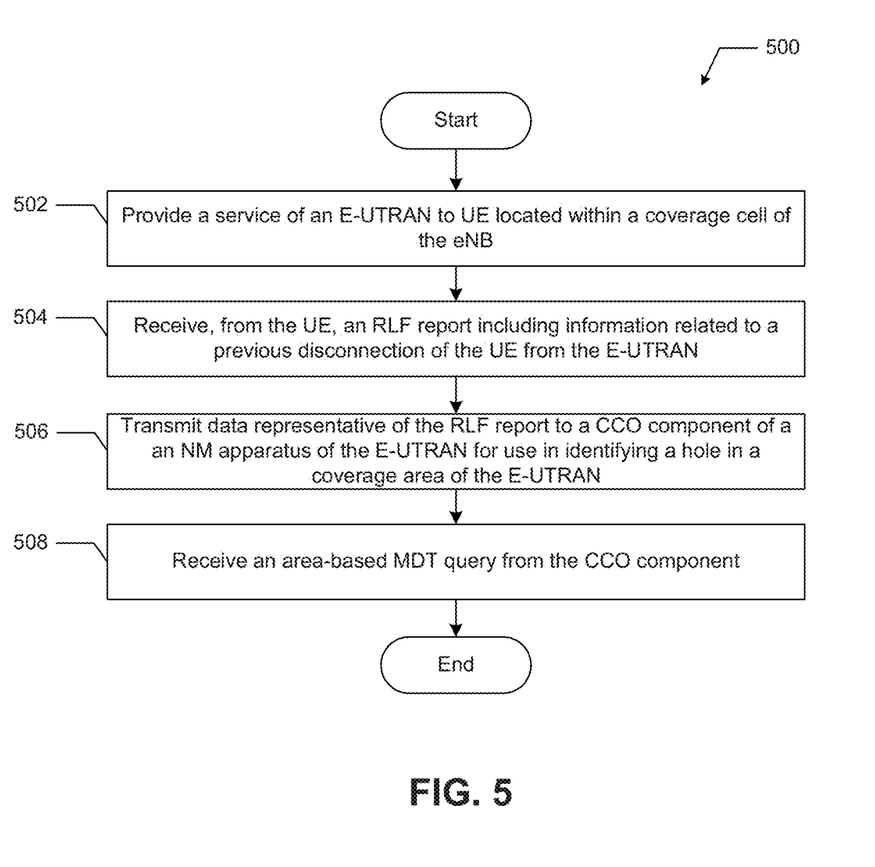
FIG. 5 is a flow diagram of an example coverage adjustment process executable by an evolved nodeB (eNB), in accordance with various embodiments.

Referring now to FIG. 5, a flow diagram of example coverage adjustment process 500 executable by an eNB (such as eNB 308 of FIG. 3) is illustrated, in accordance with various embodiments. For illustrative purposes, operations of process 500 may be described as performed by eNB 308 (FIG. 3), but process 500 may be performed by any suitably configured device.

Process 500 may begin at operation 502, in which eNB 308 may provide a service of an E-UTRAN to a UE located within a coverage cell of eNB 308. In some embodiments, operation 502 may be executed by service provision circuitry 344 (FIG. 3). At operation 504, eNB 308 may receive, from the UE, an RLF report including information related to a previous disconnection of the UE from the E-UTRAN. In some embodiments, operation 504 may be executed by second receiver circuitry 332 (FIG. 3). In some embodiments, the UE may generate the RLF report upon the previous disconnection of the UE from the E-UTRAN. In some embodiments, the information related to the previous disconnection of the UE from the E-UTRAN includes one or more of RSRP, RSRQ, an identifier of the coverage cell, location information, and a time stamp representative of a time of disconnection.

At operation 506, eNB 308 may transmit data representative of the RLF report to a CCO component (such as CCO component 342) of an NM apparatus (such as NM apparatus 302) of the E-UTRAN for use in identifying a hole in a coverage area of the E-UTRAN. In some embodiments, operation 506 may be executed by transmitter circuitry 328 (FIG. 3). In some embodiments, operation 308 may include transmitting the data over an Itf-N.

At operation 508, eNB 308 may, after the transmitting data representative of the RLF report to the CCO component of the NM apparatus of the E-UTRAN per operation 506, receive an area-based MDT query from a CCO component (e.g., CCO component 342). In some embodiments, operation 508 may be executed by first receiver circuitry 330 (FIG. 3). Process 500 may then end.

Figure 6:
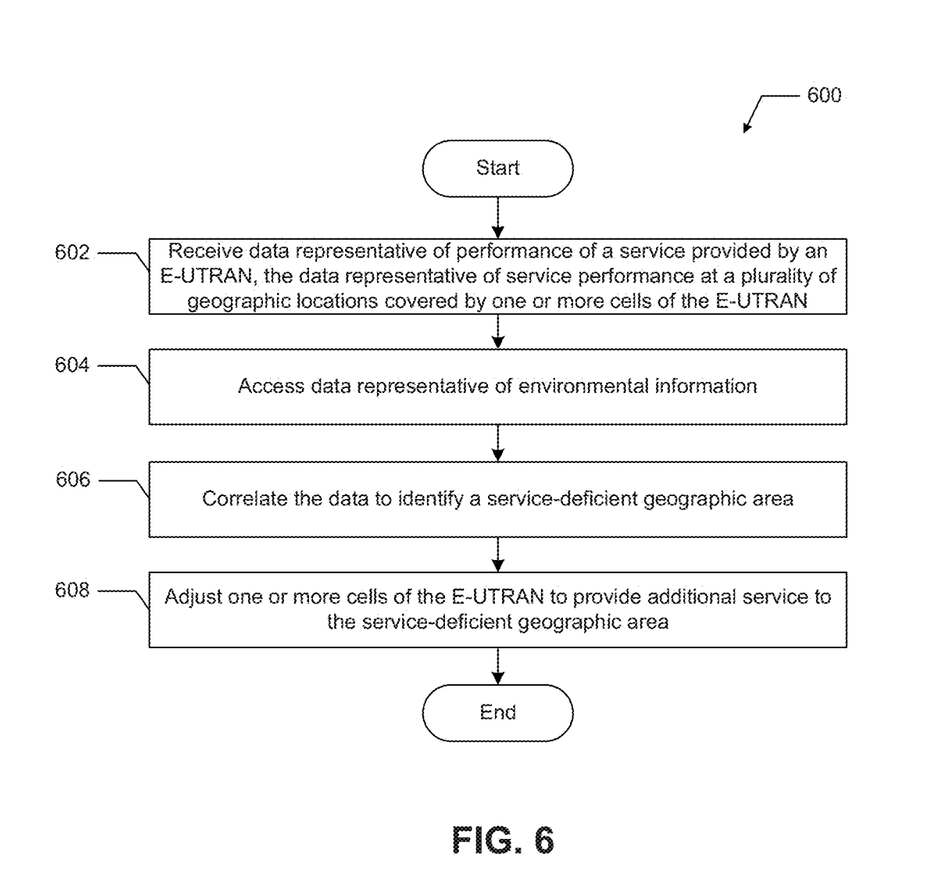
FIG. 6 is a flow diagram of a second example coverage adjustment process executable by an NM apparatus, in accordance with various embodiments.

Referring now to FIG. 6, a flow diagram of second example coverage adjustment process 600 executable by an NM apparatus (such as NM apparatus 302 of FIG. 3) is illustrated, in accordance with various embodiments. For illustrative purposes, operations of process 600 may be described as performed by NM apparatus 302 (FIG. 3), but process 600 may be performed by any suitably configured device.

Process 600 may begin at operation 602, in which NM apparatus 302 may receive data representative of performance of a service provided by an E-UTRAN. The data may be representative of service performance at a plurality of geographic locations covered by one or more cells of the E-UTRAN. In some embodiments, operation 602 may be executed by receiver circuitry 322 (FIG. 3). In some embodiments, operation 602 may include receiving data from one or more eNBs serving the one or more cells of the E-UTRAN. In some embodiments, operation 602 may include receiving data via an Itf-N. In some embodiments, the data may include one or more of a number of active UEs, upload or download PRB usage, IP throughput, packet delay, drop rate, and loss rate.

At operation 604, NM apparatus 302 may access data representative of environmental information. In some embodiments, operation 604 may be executed by coverage analysis circuitry 324 (FIG. 3). In some embodiments, the data representative of environmental information includes at least one of a location of a road and a location of a sports complex. In some embodiments, operation 604 may be optional.

At operation 606, NM apparatus 302 may correlate the data received at operation 602 (and optionally at operation 604) to identify a service-deficient geographic area. In some embodiments, operation 606 may be executed by coverage analysis circuitry 324 (FIG. 3). In some embodiments, operation 606 may include correlating the data representative of service performance (received at operation 602) and the data representative of environmental information (received at operation 604).

At operation 608, NM apparatus 302 may perform an automated CCO action to adjust one or more cells of the E-UTRAN to provide additional service to the service-deficient geographic area. In some embodiments, operation 606 may be executed by corrective action circuitry 326 (FIG. 3). In some embodiments, operation 608 may include making one or more cells smaller to boost capacity in the service-deficient geographic area. In some embodiments, operation 608 may include reshaping one or more cells by adjusting one or more corresponding antennas. In some embodiments, operation 608 may include approximately aligning a longitudinal axis of one or more cells with a longitudinal axis of one or more roads. In some embodiments, operation 608 may include making one or more cells larger to cover at least a portion of the service-deficient geographic area. Process 600 may then end.

Figure 7:
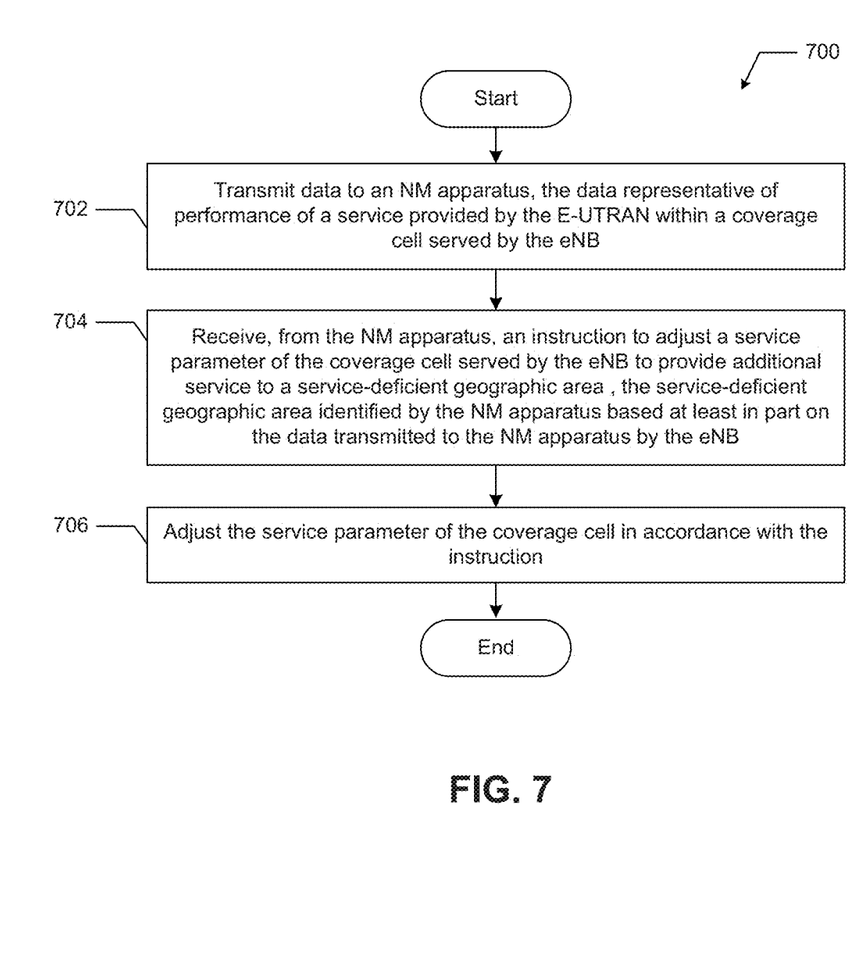
FIG. 7 is a flow diagram of a second example coverage adjustment process executable by an eNB, in accordance with various embodiments.

Referring now to FIG. 7, a flow diagram of example coverage adjustment process 700 executable by an eNB (such as eNB 308 of FIG. 3) is illustrated, in accordance with various embodiments. For illustrative purposes, operations of process 700 may be described as performed by eNB 308 (FIG. 3), but process 700 may be performed by any suitably configured device.

Process 700 may begin at operation 702, in which eNB 308 transmits data to a CCO component of an NM apparatus (such as CCO component 342 of NM apparatus 302). The data may be representative of performance of a service provided by an E-UTRAN associated with eNB 308 within a coverage cell served by eNB 308. In some embodiments, operation 702 may be executed by transmitter circuitry 328 (FIG. 3). In some embodiments, the data may include one or more of number of active UEs, upload or download PRB usage, IP throughput, packet delay, drop rate, and loss rate.

At operation 704, eNB 308 may receive, from the NM apparatus (e.g., NM apparatus 302), an instruction to adjust a service parameter of the coverage cell served by eNB 308 to provide additional service to a service-deficient geographic area. In some embodiments, the service-deficient geographic area may be identified by the NM apparatus based at least in part on the data transmitted to the NM apparatus by eNB 308 at operation 702. In some embodiments, operation 704 may be executed by first receiver circuitry 330 (FIG. 3). In some embodiments, the service-deficient geographic area may be identified by the NM apparatus based at least in part on data representative of performance of a service provided by the E-UTRAN within one or more coverage cells served by one or more eNBs other than eNB 308. In some embodiments, the instruction may be based at least in part on data representative of information about the environment proximate to the coverage cell (e.g., a location of a road and/or a location of a sporting event).

At operation 706, eNB 308 may adjust the service parameter of the coverage cell in accordance with the instruction received at operation 704. In some embodiments, operation 706 may be executed by service provision circuitry 344 (FIG.

3). In some embodiments, operation 706 may include reshaping the coverage cell. Operation 700 may then end.

Figure 8:
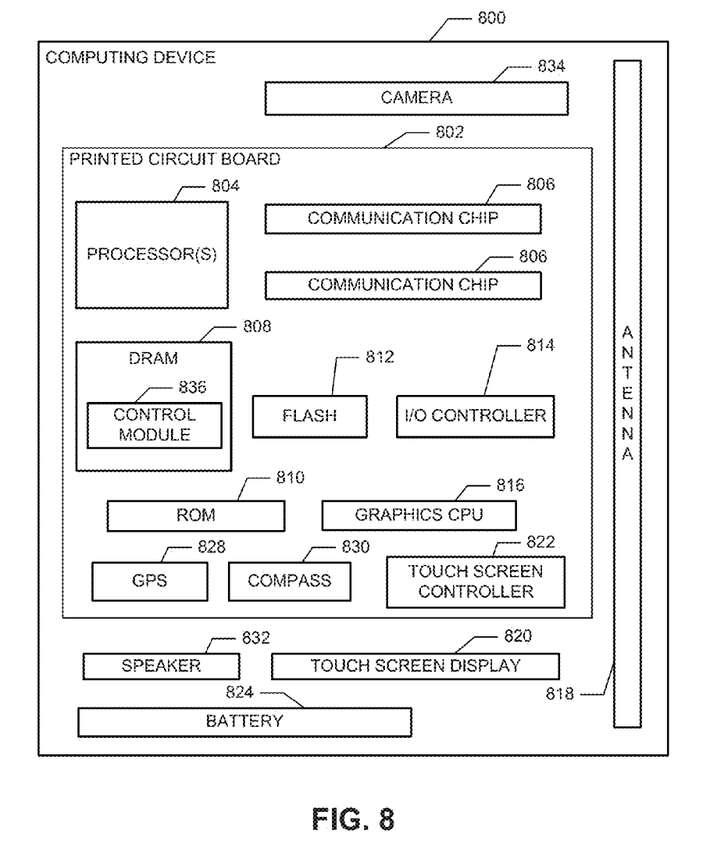
FIG. 8 is a block diagram of an example computing device suitable for practicing the disclosed embodiments, in accordance with various embodiments.

FIG. 8 is a block diagram of example computing device 800, which may be suitable for practicing various disclosed embodiments. For example, some or all of the components of computing device 800 may be used in any of the NM apparatus (such as NM apparatus 302 of FIG. 3), DM apparatus (such as DM apparatus 304 of FIG. 3, TCEs (such as TCE 306 of FIG. 3), eNBs (such as eNBs 102a-102c of FIG. 1, eNBs 504a-504g of FIG. 2, and eNBs 308-312 of FIG. 3), or UEs (such as UEs 314-220 of FIG. 3). Computing device 800 may include a number of components, including one or more processor(s) 804 and at least one communication chip 806. In various embodiments, processor 804 may include a processor core. In various embodiments, at least one communication chip 806 may also be physically and electrically coupled to processor 804. In further implementations, communication chips 806 may be part of processor 804. In various embodiments, computing device 800 may include PCB 802. For these embodiments, processor 804 and communication chip 806 may be disposed thereon. In alternate embodiments, the various components may be coupled without the employment of PCB 802. Communication chip 806 may be included in any of the receiver and/or transmitter circuitry described herein.

Depending on its applications, computing device 800 may include other components that may or may not be physically and electrically coupled to PCB 802. These other components include, but are not limited to, volatile memory (e.g., dynamic random access memory 808, also referred to as DRAM), non-volatile memory (e.g., read-only memory 810, also referred to as "ROM," one or more hard disk drives, one or more solid-state drives, one or more compact disc drives, and/or one or more digital versatile disc drives), flash memory 812, input/output controller 814, a digital signal processor (not shown), a crypto processor (not shown), graphics processor 816, one or more antenna 818, touch screen display 820, touch screen controller 822, other displays (such as liquid-crystal displays, cathode-ray tube displays and e-ink displays, not shown), battery 824, an audio codec (not shown), a video codec (not shown), global positioning system (GPS) device 828, compass 830, an accelerometer (not shown), a gyroscope (not shown), speaker 832, camera 834, and a mass storage device (such as hard disk drive, a solid state drive, compact disc (CD), digital versatile disc (DVD)) (not shown), and so forth. In various embodiments, processor 804 may be integrated on the same die with other components to form a System on Chip (SoC).

In various embodiments, volatile memory (e.g., DRAM 808), non-volatile memory (e.g., ROM 810), flash memory 812, and the mass storage device may include programming instructions configured to enable computing device 800, in response to execution by processor(s) 804, to practice all or selected aspects of the processes described herein. For example, one or more of the memory components such as volatile memory (e.g., DRAM 808), non-volatile memory (e.g., ROM 810), flash memory 812, and the mass storage device may include temporal and/or persistent copies of instructions that, when executed, enable computing device 800 to operate control module 836 configured to practice all or selected aspects of the processes described herein. Memory accessible to computing device 800 may include one or more storage resources that are physically part of a device on which computing device 800 is installed and/or one or more storage resources that is accessible by, but not necessarily a part of, computing device 800. For example, a storage resource may be accessed by computing device 800 over a network via communications chips 806.

Communication chips 806 may enable wired and/or wireless communications for the transfer of data to and from computing device 800. The term "wireless" and its derivatives may be used to describe circuits, devices, systems, methods, techniques, communication channels, etc., that may communicate data through the use of modulated electromagnetic radiation through a non-solid medium. The term does not imply that the associated devices do not contain any wires, although in some embodiments they might not. Many of the embodiments described herein may be used with WiFi and 3GPP/LTE communication systems. However, communication chips 806 may implement any of a number of wireless standards or protocols, including but not limited to IEEE 702.20, General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Bluetooth, derivatives thereof, as well as any other wireless protocols that are designated as 3G, 4G, 5G, and beyond. Computing device 800 may include a plurality of communication chips 806. For instance, a first communication chip 806 may be dedicated to shorter range wireless communications such as Wi-Fi and Bluetooth and a second communication chip 806 may be dedicated to longer range wireless communications such as GPS, EDGE, GPRS, CDMA, WiMAX, LTE, Ev-DO, and others.

In various implementations, computing device 800 may be a laptop, a netbook, a notebook, an ultrabook, a smart phone, a computing tablet, a personal digital assistant, an ultra mobile PC, a mobile phone, a desktop computer, a server, a printer, a scanner, a monitor, a set-top box, an entertainment control unit (e.g., a gaming console), a digital camera, a portable music player, or a digital video recorder. In further implementations, computing device 800 may be any other electronic device that processes data.

The following paragraphs describe examples of various embodiments. In various embodiments, an NM apparatus includes receiver circuitry to receive data representative of a first RLF report, the first RLF report including information related to a disconnection of a first UE from an E-UTRAN, and receive data representative of a second RLF report, the second RLF report including information related to a disconnection of a second UE from the E-UTRAN. The NM apparatus also includes coverage analysis circuitry to identify a hole in a coverage area of the E-UTRAN based at least in part on the first and second RLF reports, and corrective action circuitry to perform an automated CCO action to reconfigure cell resources of the E-UTRAN based on the identified hole. In some embodiments, the information related to the disconnection of the first UE from the E-UTRAN includes an RSRP, RSRQ, an identifier of a cell to which the first UE was connected prior to the disconnection of the first UE from the E-UTRAN, location information, or a time stamp representative of a time of disconnection. In some embodiments, receive data representative of a first RLF report includes receive data representative of a first RLF report from a first eNB serving the first UE upon reconnection of the first UE to the E-UTRAN. In some embodiments, receive data representative of a second RLF report includes receive data representative of a second RLF report from a second eNB serving the second UE upon reconnection of the second UE to the E-UTRAN, and the first and second eNBs are a common eNB. In some embodiments, receive data representative of a second RLF report includes receive data representative of a second RLF report from a second eNB serving the second UE upon reconnection of the second UE to the E-UTRAN, and the first and second eNBs are different eNBs. In some embodiments, wherein the coverage analysis circuitry is further to initiate area-based minimization of drive test (MDT) protocols on an evolved nodeB associated with a cell that nominally covers the identified hole. Some embodiments of an NM apparatus include combinations of the foregoing, and/or means for performing operations performed by the foregoing.

In various embodiments, an eNB includes service provision circuitry to provide a service of an E-UTRAN to a UE located within a coverage cell of the eNB; receiver circuitry to receive, from the UE, an RLF report including information related to a previous disconnection of the UE from the E-UTRAN; and transmitter circuitry to transmit data representative of the RLF report to a CCO component of an NM apparatus of the E-UTRAN for use in identifying a hole in a coverage area of the E-UTRAN. In some embodiments, the transmitter circuitry is further to transmit the data over an Itf-N. In some embodiments, the UE generates the RLF report upon the previous disconnection of the UE from the E-UTRAN. In some embodiments, the information related to the previous disconnection of the UE from the E-UTRAN includes one or more of RSRP, RSRQ, an identifier of the coverage cell, location information, and a time stamp representative of a time of disconnection. In some embodiments, the eNB further includes second receiver circuitry to, after the transmitter circuitry transmits data representative of the RLF report to the CCO component of the NM apparatus of the E-UTRAN, receive an area-based MDT query from the CCO component. Some embodiments of an eNB include combinations of the foregoing, and/or means for performing operations performed by the foregoing.

In various embodiments, an NM apparatus includes: receiver circuitry to receive data representative of performance of a service provided by an E-UTRAN, the data representative of service performance at a plurality of geographic locations covered by one or more cells of the E-UTRAN; coverage analysis circuitry to correlate the data to identify a service-deficient geographic area; and corrective action circuitry to adjust one or more cells of the E-UTRAN to provide additional service to the service-deficient geographic area. In some embodiments, the data includes one or more of number of active UEs, upload or download physical resource block usage, IP throughput, packet delay, drop rate, and loss rate. In some embodiments, the coverage analysis circuitry is further to access data representative of environmental information, and correlate the data to identify a service-deficient geographic area includes correlate the data representative of service performance and the data representative of environmental information. In some embodiments, the data representative of environmental information includes a location of a road or a sports complex. In some embodiments, adjust one or more cells of the E-UTRAN to provide additional service to the service-deficient geographic area includes make one or more cells smaller to boost capacity in the service-deficient geographic area. In some embodiments, adjust one or more cells of the E-UTRAN to provide additional service to the service-deficient geographic area includes reshape one or more cells by adjusting one or more corresponding antennas. In some embodiments, reshape one or more cells by adjusting one or more corresponding antennas includes approximately align a longitudinal axis of one or more cells with a longitudinal axis of one or more roads. In some embodiments, adjust one or more cells of the E-UTRAN to provide additional service to the service-deficient geographic area comprises make one or more cells larger to cover at least a portion of the service-deficient geographic area. In some embodiments, receive data representative of service performance at a plurality of geographic locations covered by one or more cells of the E-UTRAN includes receive data from one or more eNBs serving the one or more cells of the E-UTRAN. In some embodiments, receive data representative of service performance at a plurality of geographic locations covered by one or more cells of the E-UTRAN includes receive data via an Itf-N. Some embodiments of an NM apparatus include combinations of the foregoing, and/or means for performing operations performed by the foregoing.

In various embodiments, an eNB associated with an E-UTRAN includes: transmitter circuitry to transmit data to an NM apparatus, the data representative of performance of a service provided by the E-UTRAN within a coverage cell served by the eNB; receiver circuitry to receive, from the NM apparatus, an instruction to adjust a service parameter of the coverage cell served by the eNB to provide additional service to a service-deficient geographic area, the service-deficient geographic area identified by the NM apparatus based at least in part on the data transmitted to the NM apparatus by the eNB; and service provision circuitry to adjust the service parameter of the coverage cell in accordance with the instruction. In some embodiments, the service-deficient geographic area is identified by the NM apparatus based at least in part on data representative of performance of a service provided by the E-UTRAN within one or more coverage cells served by one or more other eNBs. In some embodiments, the data includes one or more of number of active UEs, upload or download physical resource block usage, IP throughput, packet delay, drop rate, and loss rate. In some embodiments, the instruction is based at least in part on data representative of information about the environment proximate to the coverage cell. In some embodiments, the data representative of information about the environment proximate to the coverage cell includes at least one of a location of a road and a location of a sporting event. In some embodiments, adjust the service parameter of the coverage cell served by the eNB in accordance with the instruction includes reshape the coverage cell. Some embodiments of an eNB include combinations of the foregoing, and/or means for performing operations performed by the foregoing.

Computer-readable media (including non-transitory computer-readable media), methods, systems and devices for performing the above-described techniques are illustrative examples of embodiments disclosed herein. Additionally, other devices may be configured to perform various disclosed techniques.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. A network management (NM) apparatus comprising:
receiver circuitry to receive first data representative of service performance during a period of increased wireless traffic demand in one or more cells of an evolved universal terrestrial radio access network (E-UTRAN), and the first data representative of service performance at a plurality of geographic locations covered by the one or more cells of the E-UTRAN;
coverage analysis circuitry to:
access second data representative of environmental information, wherein the second data representative of environmental information includes a geographic location of a built structure proximate to an area of increased wireless traffic demand, and
correlate the geographic locations of the first data and the geographic location of the second data to identify a service-deficient geographic area; and
corrective action circuitry to, in response to identification of the service-deficient geographic area, adjust one or more cells of the E-UTRAN to provide additional service to the service-deficient geographic area to address the increased wireless traffic demand.

2. The NM apparatus of claim 1, wherein the first data includes one or more of number of active user equipments (UEs), upload or download physical resource block usage, internet protocol (IP) throughput, packet delay, drop rate, and loss rate.

3. The NM apparatus of claim 1, wherein the second data includes a geographic location of a road or a sports complex.

4. The NM apparatus of claim 3, wherein the second data includes a geographic location of a sports complex.

5. The NM apparatus of claim 1, wherein adjust one or more cells of the E-UTRAN to provide additional service to the service-deficient geographic area includes make one or more cells smaller to boost capacity in the service-deficient geographic area.

6. The NM apparatus of claim 1, wherein adjust one or more cells of the E-UTRAN to provide additional service to the service-deficient geographic area includes reshape one or more cells by adjusting one or more corresponding antennas.

7. The NM apparatus of claim 6, wherein reshape one or more cells by adjusting one or more corresponding antennas includes approximately align a longitudinal axis of one or more cells with a longitudinal axis of one or more roads.

8. The NM apparatus of claim 1, wherein adjust one or more cells of the E-UTRAN to provide additional service to the service-deficient geographic area comprises make one or more cells larger to cover at least a portion of the service-deficient geographic area.

9. The NM apparatus of claim 1, wherein receive first data includes receive the first data from one or more evolved nodeBs (eNBs) serving the one or more cells of the E-UTRAN.

10. The NM apparatus of claim 1, wherein receive first data includes receive the first data via an interface-N (Itf-N).

11. An evolved nodeB (eNB) associated with an evolved universal terrestrial radio access network (E-UTRAN), the eNB comprising:
transmitter circuitry to transmit first data to a network management (NM) apparatus, the first data representative of service performance during a period of increased wireless traffic demand at a geographic location within a coverage cell served by the eNB;
receiver circuitry to receive, from the NM apparatus, an instruction to adjust a service parameter of the coverage cell served by the eNB to provide additional service to a service-deficient geographic area, wherein:
the service-deficient geographic area is identified by the NM apparatus based at least in part on the first data transmitted to the NM apparatus by the eNB,
the instruction is based at least in part on a correlation of the geographic location of the first data and a geographic location included in second data representative of information about the environment proximate to the coverage cell, and
the geographic location included in the second data is the geographic location of a built structure proximate to an area of increased wireless traffic demand; and
service provision circuitry to adjust the service parameter of the coverage cell in accordance with the instruction to address the increased wireless traffic demand.

12. The eNB of claim 11, wherein the service-deficient geographic area is identified by the NM apparatus based at least in part on third data representative of performance of a service provided by the E-UTRAN within one or more coverage cells served by one or more other eNBs.

13. The eNB of claim 11, wherein the first data includes one or more of number of active user equipments (UEs), upload or download physical resource block usage, internet protocol (IP) throughput, packet delay, drop rate, and loss rate.

14. The eNB of claim 11, wherein the second data includes a geographic location of a road or a sports complex.

15. The eNB of claim 14, wherein the second data includes a geographic location of a sports complex.

16. The eNB of claim 11, wherein adjust the service parameter of the coverage cell served by the eNB in accordance with the instruction includes reshape the coverage cell.

17. One or more non-transitory computer readable media having instructions thereon which, when executed by one or more processing devices of an apparatus, cause the apparatus to:
receive first data representative of service performance during a period of increased wireless traffic demand in one or more cells of an evolved universal terrestrial radio access network (E-UTRAN), and the first data representative of service performance at a plurality of geographic locations covered by the one or more cells of the E-UTRAN;
access second data representative of environmental information, wherein the second data representative of environmental information includes a geographic location of a built structure proximate to an area of increased wireless traffic demand;
correlate the geographic locations of the first data and the geographic location of the second data to identify a service-deficient geographic area; and
in response to identification of the service-deficient geographic area, adjust one or more cells of the E-UTRAN to provide additional service to the service-deficient geographic area to address the increased wireless traffic demand.

18. The one or more non-transitory computer readable media of claim 17, wherein the second data includes a geographic location of a road or a sports complex.

19. The one or more non-transitory computer readable media of claim 18, wherein the second data includes a geographic location of a sports complex.

20. The one or more non-transitory computer readable media of claim 17, wherein adjust one or more cells of the E-UTRAN to provide additional service to the service-deficient geographic area includes reshape one or more cells by adjustment of one or more corresponding antennas, and reshape one or more cells by adjustment of one or more corresponding antennas includes approximately align a longitudinal axis of one or more cells with a longitudinal axis of one or more roads.

21. The one or more non-transitory computer readable media of claim 17, wherein adjustment of one or more cells of the E-UTRAN to provide additional service to the service-deficient geographic area comprises make one or more cells larger to cover at least a portion of the service-deficient geographic area.

22. The one or more non-transitory computer readable media of claim 17, wherein receive data representative of service performance at a plurality of geographic locations covered by one or more cells of the E-UTRAN includes receive data from one or more evolved nodeBs (eNBs) serving the one or more cells of the E-UTRAN.

23. The one or more non-transitory computer readable media of claim 17, wherein receive first data representative of service performance at a plurality of geographic locations covered by one or more cells of the E-UTRAN includes receive first data via an interface-N (Itf-N).

24. One or more non-transitory computer readable media having instructions thereon which, when executed by one or more processing devices of an apparatus, cause the apparatus to:
- transmit first data to a network management (NM) apparatus, the first data representative of service performance during a period of increased wireless traffic demand, and the service provided by an evolved universal terrestrial radio access network (E-UTRAN) at a geographic location within a coverage cell served by an eNB;
- receive, from the NM apparatus, an instruction to adjust a service parameter of the coverage cell served by the eNB to provide additional service to a service-deficient geographic area, wherein:
  - the service-deficient geographic area is identified by the NM apparatus based at least in part on the first data transmitted to the NM apparatus by the eNB,
  - the instruction is based at least in part on a correlation of the geographic location of the first data and a geographic location included in second data representative of information about the environment proximate to the coverage cell, and
  - the geographic location included in the second data is the geographic location of a built structure proximate to an area of increased wireless traffic demand; and
- adjust the service parameter of the coverage cell in accordance with the instruction to address the increased wireless traffic demand.

25. The one or more non-transitory computer readable media of claim 24, wherein the service-deficient geographic area is identified by the NM apparatus based at least in part on third data representative of performance of a service provided by the E-UTRAN within one or more coverage cells served by one or more other eNBs.

26. The one or more non-transitory computer readable media of claim 24, wherein the first data includes one or more of number of active user equipments (UEs), upload or download physical resource block usage, internet protocol (IP) throughput, packet delay, drop rate, and loss rate.

27. The one or more non-transitory computer readable media of claim 24, wherein the second data includes a geographic location of a sports complex.

28. The one or more non-transitory computer readable media of claim 27, wherein the second data includes a geographic location of a sports complex.

29. The one or more non-transitory computer readable media of claim 24, wherein adjust the service parameter of the coverage cell served by the eNB in accordance with the instruction includes reshape the coverage cell.

* * * * *